(12) United States Patent
Fan et al.

(10) Patent No.: US 11,463,669 B2
(45) Date of Patent: Oct. 4, 2022

(54) IMAGE PROCESSING METHOD, IMAGE PROCESSING APPARATUS AND DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Yukun Sun, Beijing (CN); Bin Zhao, Beijing (CN); Jinghua Miao, Beijing (CN); Xi Li, Beijing (CN); Lili Chen, Beijing (CN); Hao Zhang, Beijing (CN); Jinbao Peng, Beijing (CN); Xuefeng Wang, Beijing (CN); Jianwen Suo, Beijing (CN); Wenyu Li, Beijing (CN); Zhifu Li, Beijing (CN); Shuo Zhang, Beijing (CN); Huidong He, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 215 days.

(21) Appl. No.: 16/764,101

(22) PCT Filed: Dec. 13, 2019

(86) PCT No.: PCT/CN2019/125108
§ 371 (c)(1),
(2) Date: May 14, 2020

(87) PCT Pub. No.: WO2020/140728
PCT Pub. Date: Jul. 9, 2020

(65) Prior Publication Data
US 2021/0227190 A1    Jul. 22, 2021

(30) Foreign Application Priority Data
Jan. 2, 2019  (CN) .......................... 201910002444.1

(51) Int. Cl.
*H04N 13/111*   (2018.01)
*G06T 5/00*   (2006.01)
(Continued)

(52) U.S. Cl.
CPC ............ *H04N 13/111* (2018.05); *G06T 5/006* (2013.01); *G06T 5/50* (2013.01); *G02B 27/0172* (2013.01); *G02B 2027/014* (2013.01)

(58) Field of Classification Search
CPC ....... G06T 15/005; G06T 15/50; G06T 5/006; G06T 5/007; G06T 5/50; H04N 13/111; G02B 2027/014; G02B 27/0172
See application file for complete search history.

(56) References Cited

U.S. PATENT DOCUMENTS 6,115,501 A * 9/2000 Chun .................. H04N 19/649
358/1.9
10,210,607 B1 * 2/2019 Weinschenk .............. G06T 7/60
(Continued)

FOREIGN PATENT DOCUMENTS

CN   108241211 A * 7/2018 ........... G02B 27/017
CN   108241211 A    7/2018
(Continued)

OTHER PUBLICATIONS

International Search Report dated Mar. 12, 2020, issued in counterpart application No. PCT/CN2019/125108 (11 pages).
(Continued)

*Primary Examiner* — Mekonen T Bekele
(74) *Attorney, Agent, or Firm* — WHDA, LLP

(57) ABSTRACT

An image processing method is disclosed. The image processing method may include: partitioning an original gridded image to obtain a plurality of regional grid images, wherein the regional grid images are distributed along a direction away from a geometric center of the original gridded image (S300); and adjusting grid vertices of the regional grid images based on anti-distortion parameters to obtain a plurality of regional correction grid images forming a grid correction image (S400). A grid density of each of the regional correction grid images may be smaller than or equal to a grid density of a corresponding regional grid image, and the grid density of each of the plurality of the regional correction grid images may gradually increase along the direction away from the geometric center of the original gridded image.

18 Claims, 13 Drawing Sheets

(51) Int. Cl.
*G06T 5/50* (2006.01)
*G02B 27/01* (2006.01)

(56) References Cited

U.S. PATENT DOCUMENTS

| | | |
|---|---|---|
| 2007/0115384 A1 | 5/2007 | Furukawa |
| 2008/0089607 A1* | 4/2008 | Hirade .................. G06T 5/006 382/275 |
| 2016/0180501 A1* | 6/2016 | Mallet .................. H04N 5/2628 382/164 |
| 2017/0032503 A1* | 2/2017 | Raichman ............ G06T 3/0068 |
| 2018/0365877 A1* | 12/2018 | Watola .................. G06T 5/006 |
| 2019/0102868 A1* | 4/2019 | Beric .................. H04N 5/3572 |
| 2019/0279427 A1 | 9/2019 | Tang et al. |

FOREIGN PATENT DOCUMENTS

| | | | |
|---|---|---|---|
| CN | 108282648 A | | 7/2018 |
| CN | 108596854 A | | 9/2018 |
| CN | 108648254 A | * | 10/2018 |
| CN | 108648254 A | | 10/2018 |
| CN | 109754380 A | | 5/2019 |
| WO | 2012/161431 A3 | | 1/2013 |
| WO | 2018/201652 A1 | | 11/2018 |

OTHER PUBLICATIONS

Office Action dated Jun. 3, 2020, issued in counterpart CN application No. 201910002444.1, with English translation. (20 pages).

\* cited by examiner

Related Art

Related Art

Related Art

IMAGE PROCESSING METHOD, IMAGE PROCESSING APPARATUS AND DISPLAY APPARATUS

CROSS-REFERENCE TO RELATED APPLICATIONS

This application claims benefit of the filing date of Chinese Patent Application No. 201910002444.1 filed on Jan. 2, 2019, the disclosure of which is hereby incorporated in its entirety by reference.

TECHNICAL FIELD

The present disclosure relates to display technologies, and in particular, to an image processing method, an image processing apparatus, and a display apparatus.

BACKGROUND

Virtual reality (VR) is a computer simulation method that can create a virtual world and provide virtual world experience. A VR display generates a simulated environment to let users immerse into the environment, giving the user a realistic experience. In order to meet the requirements of VR display, the VR display device needs to have a high frame rate, so that the display device has better image rendering quality.

In the immersive environment, the images displayed by the VR device changes rapidly. The images that the user sees are more likely to be distorted, thereby causing the user to be prone to vertigo in the immersive environment. At present, the grid anti-distortion processing method is a popular method of processing distorted images. Specifically, grids are generated in the image, and an anti-distortion process is applied to the grid vertices of the regions where the image has low grid density, thereby reducing the amount of processed image data. When the VR display device does not possess high capability of image rendering, the grid anti-distortion processing method cannot process a large amount of image data, thereby reducing the anti-distortion effect of the grid anti-distortion processing method, and also making the VR image prone to frame loss.

BRIEF SUMMARY

One embodiment of the present disclosure provides an image processing method. The image processing method may include: partitioning an original gridded image to obtain a plurality of regional grid images, wherein the regional grid images are distributed along a direction away from a geometric center of the original gridded image; and adjusting grid vertices of the regional grid images based on anti-distortion parameters to obtain a plurality of regional correction grid images forming a grid correction image. A grid density of each of the regional correction grid images may be smaller than or equal to a grid density of a corresponding regional grid image, and the grid density of each of the plurality of the regional correction grid images may gradually increase along the direction away from the geometric center of the original gridded image.

Optionally, partitioning the original gridded image to obtain the plurality of regional grid images may include obtaining a partition factor α based on distortion coefficient distribution characteristic of a lens of a VR display apparatus and the original gridded image, wherein a is an integer greater than or equal to 1; and partitioning the original gridded image based on the partition factor α to obtain the plurality of regional grid images. The plurality of regional grid images may be distributed along the direction away from the geometric center of the original gridded image, and a number of grids contained in each of the regional grid images is an integer multiple of the partition factor α.

Optionally, the original gridded image may include a 24×24 grid matrix and may be divided into three regional grid images along the direction away from the geometric center of the original gridded image, the three regional grid images may include a first regional grid image, a second regional grid image, and a third regional grid image, the first regional grid image may include a 10×10 grid matrix, and a geometric center of the first regional grid image may be the geometric center of the original gridded image, the second regional grid image may include a 18×18 grid matrix outside the first regional grid image, the third regional grid image may include a 24×24 grid matrix outside the second regional grid image.

Optionally, the original gridded image may include an N×N grid matrix, and N may be an integer greater than 1; and obtaining the partition factor α based on the distortion coefficient distribution characteristic of the lens of the VR display apparatus and the original gridded image may include: obtaining a regional adjustment parameter k based on the distortion coefficient distribution characteristic of the lens of the VR display apparatus, wherein k is an integer greater than 0; obtaining a unidirectional grid parameter N based on the original gridded image; determining whether the unidirectional grid parameter N is an integer multiple of k; if the unidirectional grid parameter N is an integer multiple of k, obtaining a partition factor α based on the unidirectional grid parameter N and the regional adjustment parameter k; and otherwise, resetting the unidirectional grid parameter N to obtain a grid correction parameter N', which is an integer multiple of k, and obtaining the partition factor α base on the grid correction parameter N' and the regional adjustment parameter k, wherein $$|N - N'| \le \frac{k}{2}.$$

Optionally, partitioning the original gridded image based on the partition factor α may include: obtaining central grid vertex information of the original gridded image from the original gridded image, wherein the central grid vertex information of the original gridded image is the geometric center of the original gridded image; obtaining the plurality of regional grid images based on the geometric center of the original gridded image and the partition factor α, wherein the number of grids contained in each of the region grid images is an integer multiple of the partition factor α; and obtaining each grid vertex information in the plurality of regional grid images based on the plurality of regional grid images, wherein the plurality of regional grid images is distributed along the direction away from the geometric center of the original gridded image.

Optionally, adjusting the grid vertices of the regional grid images based on the anti-distortion parameters to obtain the plurality of regional correction grid images forming the grid correction image may include: obtaining position coordinates of each grid vertex contained in each of the regional correction grid images from position coordinates of each grid vertex contained in each of the regional grid images; obtaining texture coordinates of each grid vertex contained in each of the regional correction grid images based on the anti-distortion parameters and texture coordinates of each grid vertex contained in each of the regional grid images; and performing a mapping process based on the position coordinates of each grid vertex and the texture coordinates of each grid vertex in each of the regional correction grid images, thereby obtaining the grid correction image.

Optionally, the image processing method, before partitioning the original gridded image, may further include: receiving original image data, anti-distortion parameters, and vertical synchronization signals; and if the vertical synchronization signals are received, performing grid rendering on the original image data to obtain two original gridded images.

Optionally, the two original gridded images comprise a left eye original gridded image and a right eye original gridded image.

Optionally, the image processing method, after obtaining the grid correction image formed by the plurality of regional correction grid images, may further include updating the original image data.

Another embodiment of the present disclosure provides an image processing apparatus. The image processing apparatus may include: a partitioning module, configured to partition an original gridded image to obtain a plurality of regional grid images, wherein the plurality of regional grid images are distributed along a direction away from a geometric center of the original gridded image; and a grid reconstruction module, configured to adjust grid vertices of the regional grid images based on anti-distortion parameters to obtain a plurality of regional correction grid images forming a grid correction image. A grid density of each of the regional correction grid images may be smaller than or equal to a grid density of a corresponding regional grid image, and the grid density of each of the plurality of the regional correction grid images may gradually increase along the direction away from the geometric center of the original gridded image.

Optionally, the partitioning module may be configured to obtain a partition factor α based on distortion coefficient distribution characteristic of a lens of a VR display apparatus and the original gridded image, and partition the original gridded image based on the partition factor α to obtain the plurality of regional grid images. The plurality of regional grid images may be distributed along the direction away from the geometric center of the original gridded image, and a number of grids contained in each of the regional grid images may be an integer multiple of the partition factor α, and α is an integer greater than or equal to 1.

Optionally, the original gridded image may include an N×N grid matrix, and N may be an integer greater than one; and the partitioning module is configured to: obtain a regional adjustment parameter k based on the distortion coefficient distribution characteristic of the lens of the VR display apparatus, wherein k is an integer greater than 0; obtain a unidirectional grid parameter N based on the original gridded image; determine whether the unidirectional grid parameter N is an integer multiple of k; if the unidirectional grid parameter N is an integer multiple of k, obtain the partition factor α based on the unidirectional grid parameter N and the regional adjustment parameter k; and if otherwise, reset the unidirectional grid parameter N to obtain a grid correction parameter N', which is an integer multiple of k, and obtain the partition factor α base on the grid correction parameter N' and the regional adjustment parameter k, wherein $$|N - N'| \leq \frac{k}{2}.$$

Optionally, the partitioning module may be further configured to: obtain central grid vertex information of the original gridded image from the original gridded image, wherein the central grid vertex information of the original gridded image is the geometric center of the original gridded image; obtain the plurality of regional grid images based on the geometric center of the original gridded image and the partition factor α, wherein the number of grids contained in each of the regional grid images is an integer multiple of the partition factor α; and obtain each grid vertex information in the plurality of regional grid images based on the plurality of regional grid images, wherein the plurality of regional grid images is distributed along the direction away from the geometric center of the original gridded image.

Optionally, the grid reconstruction module may be configured to: obtain position coordinates of each grid vertex contained in each of the regional correction grid images from position coordinates of each grid vertex contained in each of the regional grid images; and obtain texture coordinates of each grid vertex contained in each of the regional correction grid images based on the anti-distortion parameters and texture coordinates of each grid vertex contained in each of the regional grid images.

Optionally, the image processing apparatus may further include a mapping module, configured to perform a mapping process based on the position coordinates of each grid vertex and the texture coordinates of each grid vertex in each of the regional correction grid images to obtain the grid correction image.

Optionally, the image processing apparatus may further include:

a receiving module, configured to receive original image data, anti-distortion parameters, and vertical synchronization signals before partitioning the original gridded image; and a rendering module, configured to perform grid rendering on the original image data when the vertical synchronization signals are received, thereby obtaining two original gridded images.

Optionally, after obtaining the grid correction image formed by the plurality of regional correction grid images, the receiving module may be further configured to update the original image data.

Optionally, the two original gridded images may include a left eye original gridded image and a right eye gridded image.

Another embodiment of the present disclosure provides a computer product. The computer product may include one or more processors, the one or more processors may be configured to implement the image processing method.

Another embodiment of the present disclosure provides a computer storage medium having stored thereon computer program instructions. The image processing method may be implemented when the computer program instructions are executed by a processor.

BRIEF DESCRIPTION OF THE DRAWINGS

The drawings are intended to provide a further understanding of the technical solutions of the present disclosure, and are intended to be a part of the specification, and are used to explain the technical solutions of the present dis

DETAILED DESCRIPTION

The technical solutions in the embodiments of the present disclosure are described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without creative efforts are within the scope of the present disclosure.

Figure 1:
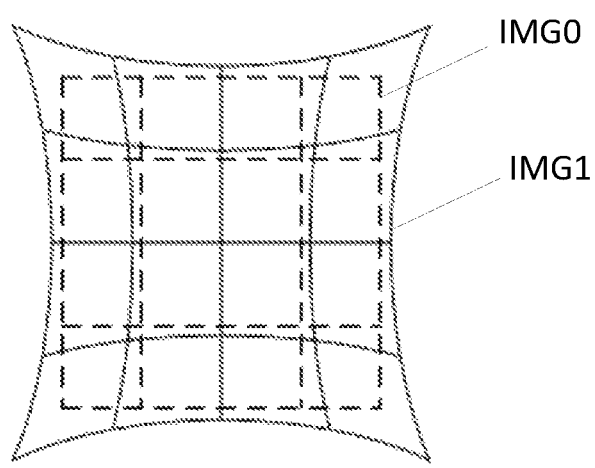
- FIG. 1 is a schematic diagram comparing a pincushion distortion image and a normal image.

In an immersive environment, a convex lens of the VR display device is close to the user's eyes. Thus, the user can see a VR image in a large field of view. The larger the field of view of the VR image viewed by the user, the greater the distortion of the VR image seen by the user. When viewing a VR image, the user theoretically should see the normal image IMG0 enclosed by the dashed line in FIG. 1. However, due to the distortion of the VR image, in the VR image seen by the user, the part of the image that is far away from the geometric center of the VR image appears to be stretched. Therefore, when the VR image seen by the user is distorted, the VR image seen by the user changes from the image enclosed by the dashed line in FIG. 1 to the pincushion distortion image IMG1 as indicated by the solid line. The image information is generally processed by a grid anti-distortion technique to reduce the distortion of the VR image. The grid anti-distortion technique mainly uses an image processor to perform an anti-distortion process on the grid vertices of the VR image, thereby avoiding performing an anti-distortion process on each pixel. As such, the amount of computation by the image processor is reduced, thereby lowering the configuration requirements of the image processor for the anti-distortion processing.

Figure 2:
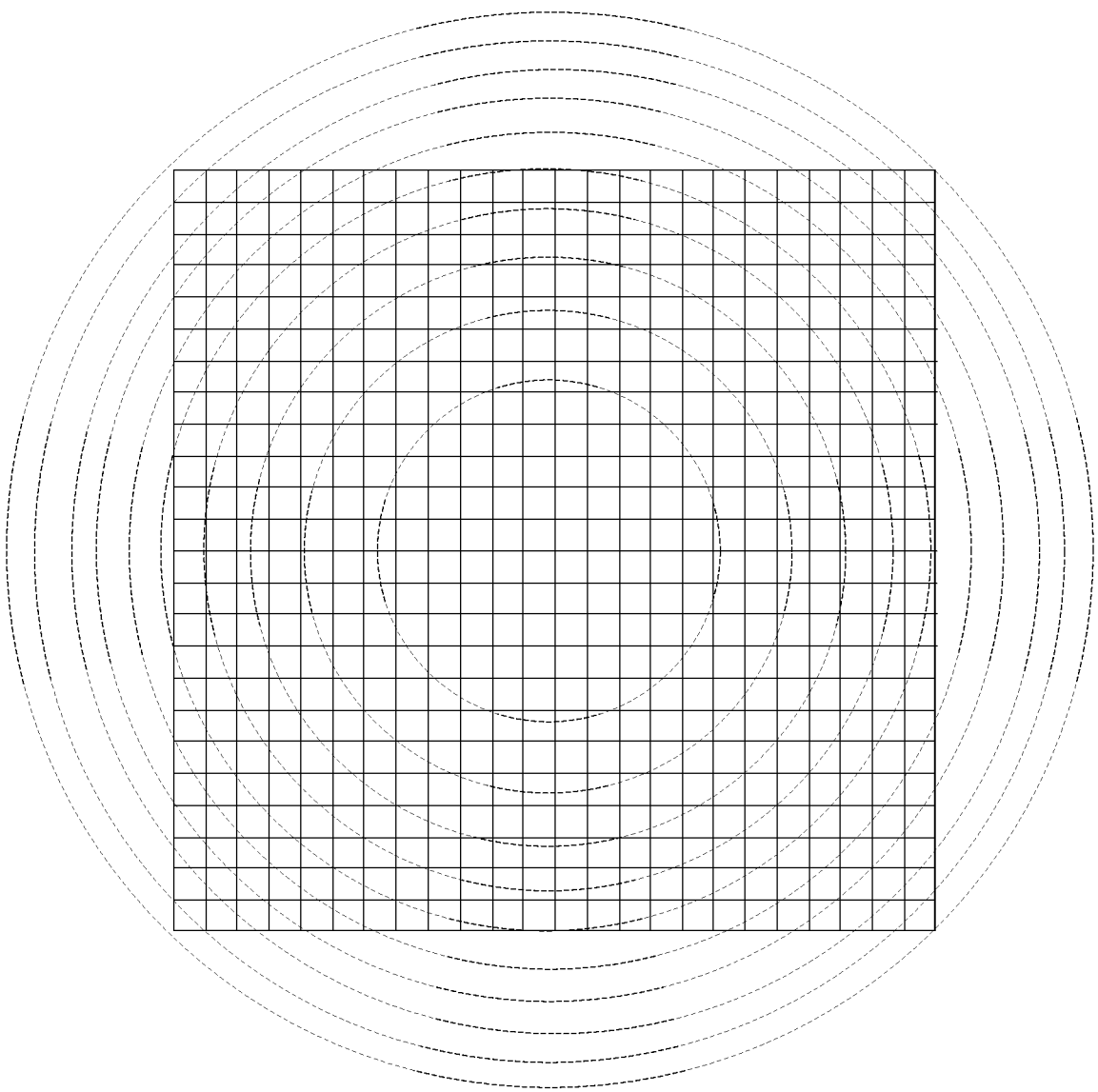
FIG. 2 is a schematic diagram of image distortion distribution.

FIG. 2 shows relationship between the distortion coefficient of the lens and the gridded image. The dashed circle in FIG. 2 represents the distortion coefficient, and different dashed circles represent different distortion coefficients. The region having a higher density of the dashed circles indicates a higher level of image distortion at the corresponding region of the gridded image. As shown in FIG. 2, the level of distortion of the gridded image seen by the user gradually increases along the direction away from the geometric center of the gridded image.

As shown in FIG. 2 and FIGS. 6 to 9, one embodiment of the present disclosure provides an image processing method based on the relationship between the distortion parameter of the lens and the level of distortion of the gridded image. The image processing method can be used in a common display device and also be used in a virtual reality display device. In one embodiment, the image processing method includes:

Step S300: partitioning the original gridded image to obtain a plurality of regional grid images, where the plurality of regional grid images are distributed along a direction away from the geometric center of the original gridded image;

Step S400: adjusting grid vertices of the regional grid images based on anti-distortion parameters to obtain a plurality of regional correction grid images forming a grid correction image, wherein the grid density of each of the regional correction grid images is less than or equal to the grid density of the corresponding regional grid image, and the grid density of each of the plurality of the regional correction grid images gradually increases along the direction away from the geometric center of the original gridded image.

On the basis of the process in the image processing method described above, the grid vertices of the plurality of regional grid images are adjusted based on the anti-distortion parameters, and the grid correction image formed by the plurality of regional correction grid images is obtained, such that the grid density of each regional correction grid image is less than or equal to the grid density of the corresponding regional grid image. In the image processing method, the number of grid vertices contained in the grid correction image is reduced with respect to the number of grid vertices contained in the original gridded image. Therefore, the amount of data processed during the image processing is reduced, thereby not only reducing the image processing time effectively, but also lowering the probability of frame loss in the post-mapping. Correspondingly, the image processing method demand relatively low hardware requirements for the image processor.

The distortion of the image seen by the user in the existing technology gradually increases along the direction away from the geometric center of the original gridded image. The number of grid vertices in the plurality of regional correction grid images increases with the level of distortion. On the basis of that, in one embodiment of the present disclosure, the grid vertices of the plurality of the regional grid images are adjusted based on the anti-distortion parameters, and the obtained plurality of regional correction grid images have grid densities that increase gradually along the direction away from the geometric center of the original image, such that the densities of the grid vertices contained in the plurality of regional correction grid images increase gradually. The larger the number of grids involved in the grid anti-distortion process, the better the effect of the anti-distortion processing. Therefore, based on the level of distortion in different regions of the image seen by the user, the image processing method controls the density of the grid vertices in each region of the grid correction image to reduce the level of image distortion, thereby alleviating the vertigo feeling caused by the image distortion when the user views the image.

The image processing method according to one embodiment of the present disclosure can reduce the image distortion while reducing the amount of image data processed. In the case where the reduction of the image distortion is the same, the image processing method according to one embodiment of the present disclosure processes less data. In the case where the original gridded image contains a same amount of grid vertices, the image processing method according to one embodiment of the present disclosure can obtain a final image with less image distortion, which may be closer to a distortion-free image.

That is, as the level of the image distortion in the image processed by the image processing method in one embodiment of the present disclosure is the same as that by the existing grid anti-distortion method, the hardware requirements for the image processor is relatively low in the image processing method provided in some embodiments of the present disclosure. As the number of grids contained in the original gridded image processed by the image processing method of the present disclosure is the same as that processed by the existing grid anti-distortion method, the level of distortion in the image processed by the image processing method provided in some embodiments of the present disclosure is relatively low and much more similar to the distortion-free image.

Figure 9:
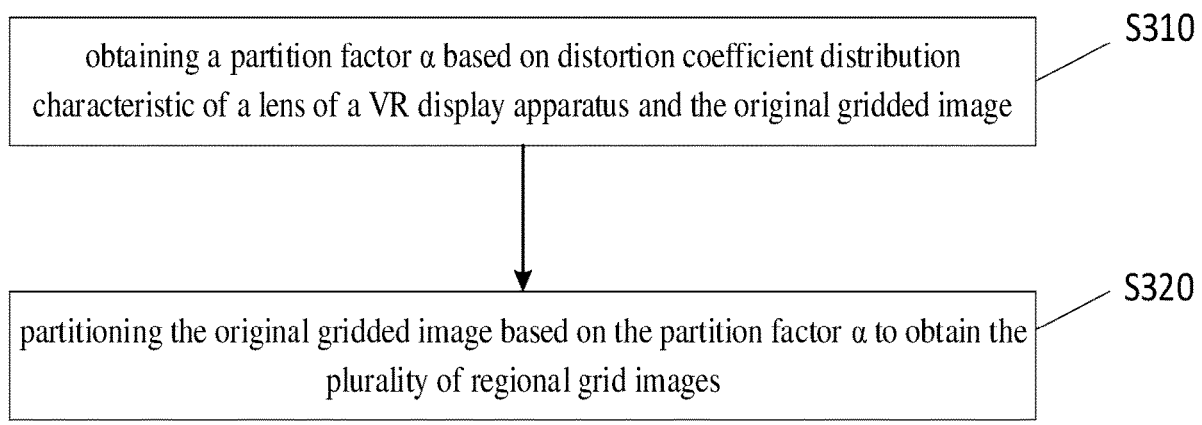
FIG. 9 is a flowchart of an image processing method according to one embodiment of the present disclosure.

In some embodiments, for a common display device, the image information can be directly mapped to the rendered image after rendering the image information. For a display device that is prone to image distortion such as a VR display device, after the image is rendered, an anti-distortion process needs to be performed on the rendered image. Then a mapping process is performed on the image after the anti-distortion process. On the basis of that, in some embodiments, as shown in FIG. 9, before partitioning the original gridded image, the image processing method further includes:

Step S100: receiving original image data, anti-distortion parameters and vertical synchronization signals based on the distortion parameter of the lens and the distance between the lens of the VR display device and the user's eyes.

Step S150: determining whether vertical synchronization signals are received.

If the vertical synchronization signals are received, it indicates that image rendering is required, and then performing step S200.

Otherwise, returning to step S100 to receive the vertical synchronization signals.

Step S200: performing grid rendering on the original image data to obtain two original gridded images. For a VR display device, the two original gridded images include a left eye original gridded image and a right eye gridded image.

In some embodiments, after obtaining the grid correction image formed by the plurality of regional correction grid images, the image processing method further includes:

Step S500: determining whether to terminate the application.

If the application continues, it indicates not to terminate the application. Then, step S600 is executed.

Step 600: updating the original image data, and preparing to process the next frame of image.

It should be understood that after the anti-distortion processing of the current image, it should be determined that there is no original image data to be update, and then the image processing is terminated.

Figure 6:
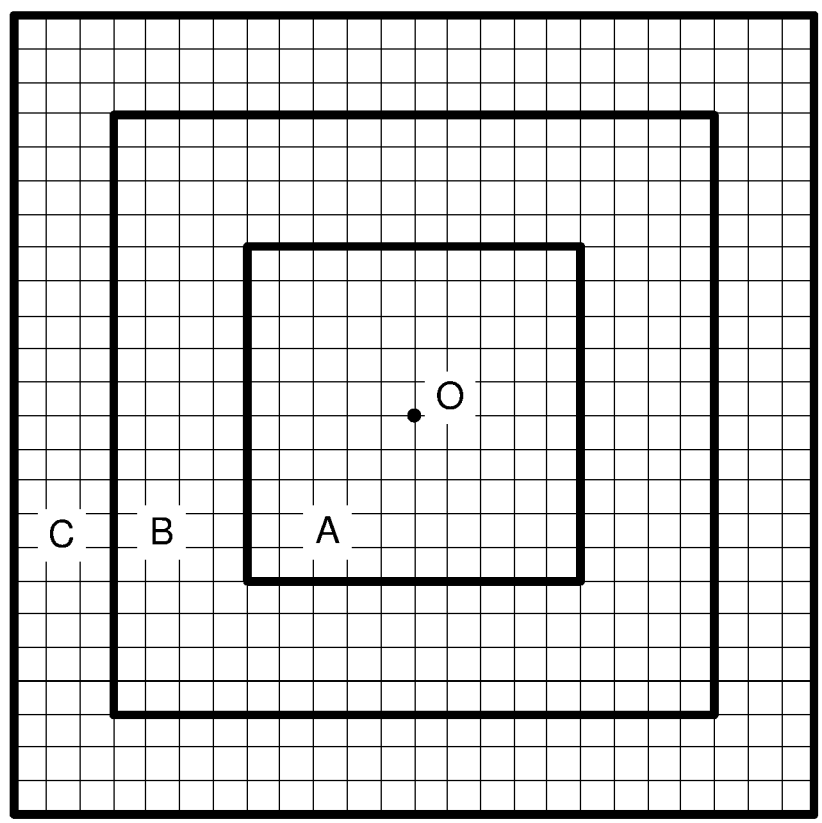
FIG. 6 is a schematic diagram showing distribution of a plurality of regional grid images according to one embodiment of the present disclosure.
Figure 10:
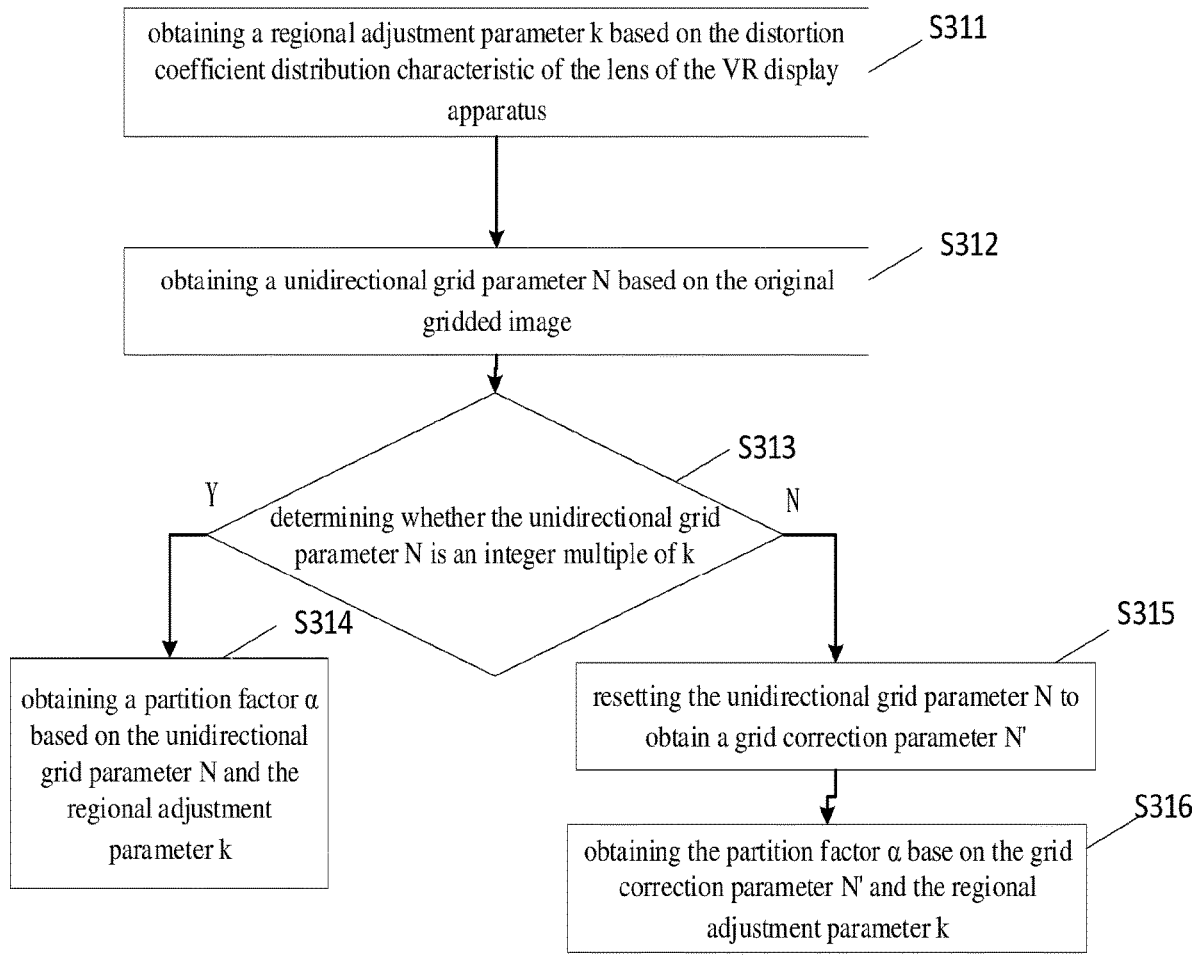
FIG. 10 is a flowchart of an image processing method according to one embodiment of the present disclosure.

In some embodiments, considering that the screen displayed by the VR display device is generally divided into a left eye image and a right eye image, the outlines of the left eye image and the right eye image are positive outlines. Therefore, the original gridded image may be set to contain an N×N grid matrix, where N is an integer greater than 1. Based on that, as shown in FIG. 2, FIG. 6 and FIG. 10, the above-mentioned partitioning the original gridded image to obtain a plurality of regional grid images includes:

Step S310: obtaining a partition factor $\alpha$, where $\alpha$ is an integer greater than or equal to 1, based on the distortion coefficient distribution characteristic of the lens and the original gridded image. As described in the above analysis, the gridded image has a certain correspondence with the lens distortion coefficient of the VR display device. That is, the lens distortion coefficient gradually increases along the direction away from the geometric center of the lens. Correspondingly, when the user sees the VR image displayed by the VR display device through the lens, the VR image becomes more distorted along the direction away from the geometric center of the VR image.

Step S320: partitioning the original gridded image based on the partition factor $\alpha$ to obtain a plurality of regional grid images, wherein the plurality of regional grid images are distributed along the direction away from the geometric center of the original gridded image, and the number of grids contained in each of the regional grid images is an integer multiple of the partition factor $\alpha$.

The partition factor $\alpha$ is obtained based on the distortion coefficient distribution characteristics of the lens of the VR display device and the original gridded image. The original gridded image is partitioned based on the partition factor $\alpha$, such that the obtained plurality of regional grid images are distributed corresponding to the distortion coefficient distribution characteristics of the lens. Since the distortion coefficient distribution characteristic of the lens is that the lens distortion coefficient increases gradually along the direction away from the geometric center of the lens, the plurality of regional grid images are distributed along the direction away from the geometric center of the original gridded image. If the anti-distortion process is not performed on the plurality of regional grid images, the distortion of the plurality of regional grid images becomes larger along the direction away from the geometric center of the original gridded image.

Optionally, as shown in FIG. 10, based on the distortion coefficient distribution characteristic of the lens of the VR display device and the original gridded image, obtaining the partition factor $\alpha$ includes:

Step S311: obtaining a regional adjustment parameter k, where k is an integer greater than 0, based on the distortion coefficient distribution characteristic of the lens of the VR display device.

Step S312: obtaining a unidirectional grid parameter N based on the original gridded image. The unidirectional grid parameter N refers to the number of grids per row in the original gridded image when the original gridded image is a square. For example, if the original gridded image contains a 24×24 grid matrix, the unidirectional grid parameter N=24; if the original gridded image contains a 48×48 grid matrix, the unidirectional grid parameter N=48. The step may be performed at the same time as the step S311, or may be performed sequentially.

Step S313: determining whether the unidirectional grid parameter N is an integer multiple of k.

If the unidirectional grid parameter N is an integer multiple of k, the step S314 is performed.

Otherwise, it indicates that the unidirectional grid parameter N needs to be corrected, and the step S315 is performed at this time.

Step S314: obtaining a partition factor α based on the unidirectional grid parameter N and the regional adjustment parameter k. For example, if the unidirectional grid parameter N=24 and the regional adjustment parameter k=24, α=1.

Step S315: resetting the unidirectional grid parameter N to obtain a grid correction parameter N', which is an integer multiple of k, wherein $$|N - N'| \le \frac{k}{2}.$$

For example, if the unidirectional grid parameter N=27 and the unidirectional grid parameter N=27 is not an integer multiple of 24, the unidirectional grid parameter N should be reset so that the grid correction parameter N'=24, so α=1. If the unidirectional grid parameter N=46, the unidirectional grid parameter N=46 is not an integer multiple of 24. The unidirectional grid parameter N should be reset such that the grid correction parameter N'=48, so α=2. If the unidirectional grid parameter N=36, the unidirectional grid parameter N=36 is not an integer multiple of 24. The unidirectional grid parameter N should be reset such that the grid correction parameter N'=48, so α=2 or the grid correction parameter N'=24, α=1.

Step S316: obtaining the partition factor α based on the grid correction parameter N' and the regional adjustment parameter k.

Figure 4:
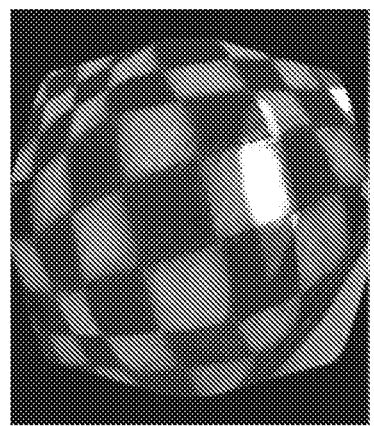
FIG. 4 is a schematic diagram of an image obtained by an existing grid anti-distortion process performed on an original gridded image.

FIG. 4 shows an image obtained after performing the existing anti-distortion process on the original gridded image, wherein the unidirectional grid parameter N is an integer multiple of 4. The image shows obvious discrepancies distributed at the grid vertices. The discrepancies distributed at the grid vertices in the image is mainly due to the fact that the original gridded image contains fewer grid vertices, and the connections of the vertices are not smooth, thereby affecting the interpolation computation to obtain each grid information by the image processor using the texture coordinates of these grid vertices. Therefore, when the user sees the image, the image appears to be composed of multiple image patches and the smoothness is low, which is more obvious when the display device vibrates.

Figure 5:
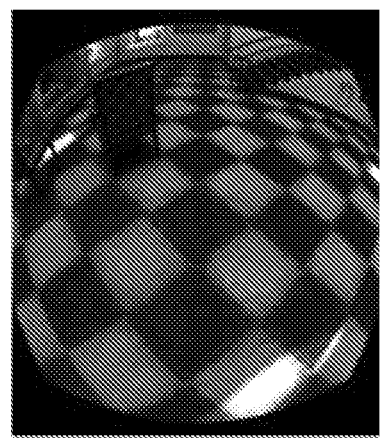
FIG. 5 is a schematic diagram of an image obtained by an existing grid anti-distortion processing performed on an original gridded image.

FIG. 5 shows an image obtained after performing the existing anti-distortion process on the original gridded image, where the unidirectional grid parameter N is an integer multiple of 32. Since the original gridded image contains a larger number of grid vertices, the image obtained after the grid anti-distortion processing shows a better displaying effect. However, the rendering capability of the existing mobile terminal is still not comparable to the PC. For example, for a VR integrated device that uses a Samsung 8890 processor, when the number of grids involved in the grid anti-distortion process reaches 32×32, the long mapping time causes frequent occurrence of frame loss. Therefore, the number of grids involved in the grid anti-distortion processing has an important impact on the effect of grid anti-distortion processing.

Figure 3:
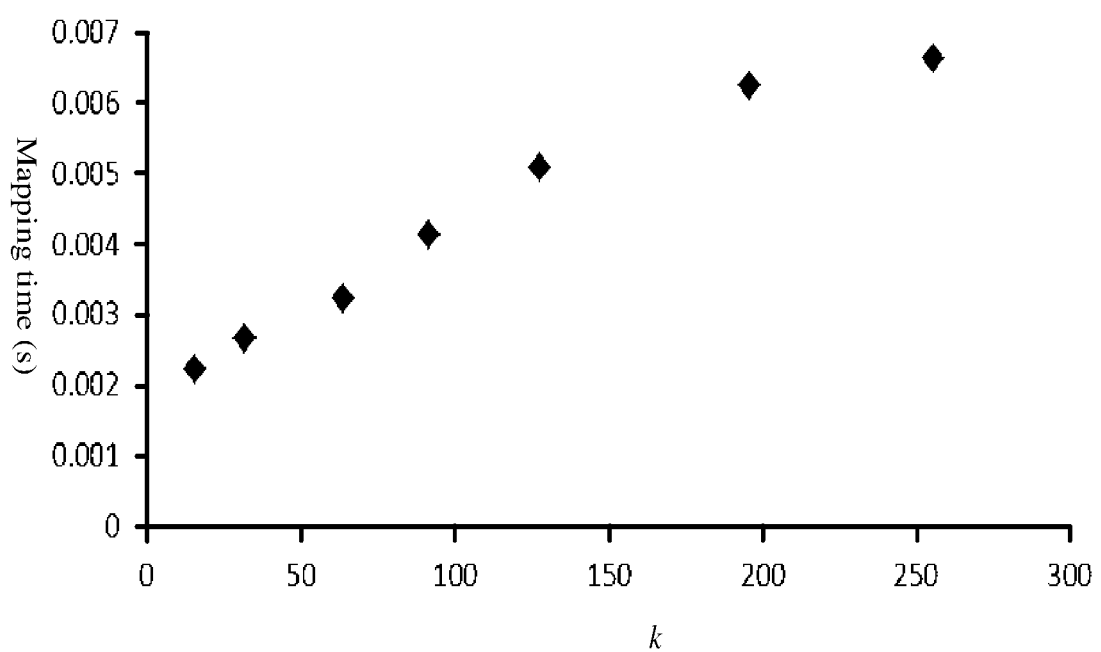
FIG. 3 shows the correspondence between mapping time and regional adjustment parameter.

For example, the correspondence between the number of single eye grids and the mapping time is measured statistically in a VR display device with a refreshing rate of 75 fps. As shown in FIG. 3, the statistical result indicates that as the number of grids increases, the mapping time of the image processor increases linearly. For the VR display device with the refreshing rate of 75 fps, the image refreshing time per frame is 13.3 ms and the maximum mapping time allocated to a single eye is 6.6 ms. As seen in FIG. 3, as the number of single eye grids is 256×256, the mapping time exceeds 6.6 ms, which causes the VR display device to experience severe jamming during image display. Therefore, when the gridded image processed by the image processor contains a unidirectional grid parameter N greater than or equal to 4 and less than or equal to 28, the grid anti-distortion demands relatively low requirements for the hardware configuration of the image processor. Based on this, the value range of k is set to be greater than or equal to 4 and less than or equal to 28 to determine whether the unidirectional grid parameter N is an integer multiple of k. If the unidirectional grid parameter N is not an integer multiple of k, reset the unidirectional grid parameter N and let the unidirectional grid parameter N be an integer multiple of k.

Figure 11:
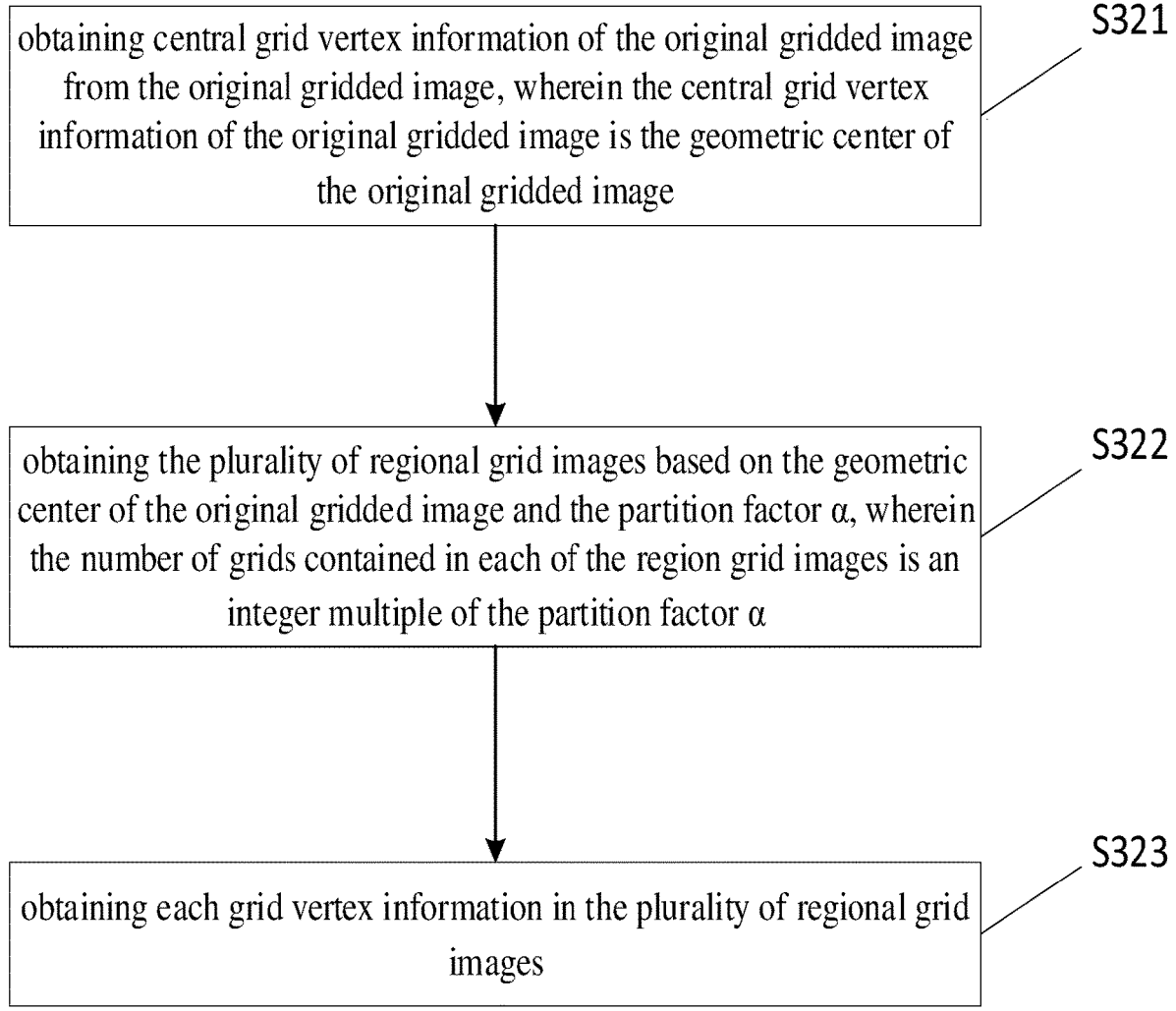
FIG. 11 is a flowchart of an image processing method according to one embodiment of the present disclosure.

In some embodiments, as shown in FIG. 11, partitioning the original gridded image based on the partition factor includes:

Step S321: obtaining central grid vertex information of the original gridded image from the original gridded image, such that the central grid vertex information of the original gridded image is the geometric center of the original gridded image.

Step S322: determining a plurality of regional grid images based on the geometric center of the original gridded image and the partition factor α, such that the number of grids included in each of the regional grid images is an integer multiple of the partition factor α. The geometric center of the regional grid images closest to the geometric center of the original gridded image is the same as the geometric center of the original gridded image. The plurality of regional grid images is distributed along the direction away from the geometric center of the original gridded image.

Step S323: obtaining each grid vertex information included in the plurality of regional grid images based on the plurality of regional grid images. The grid vertex information includes the grid vertex position coordinates and the grid vertex texture coordinates. The plurality of regional grid images is distributed along the direction away from the geometric center of the original gridded image. The geometric center of the region grid images closest to the geometric center of the original gridded image is the same as the geometric center of the original gridded image.

Figure 12:
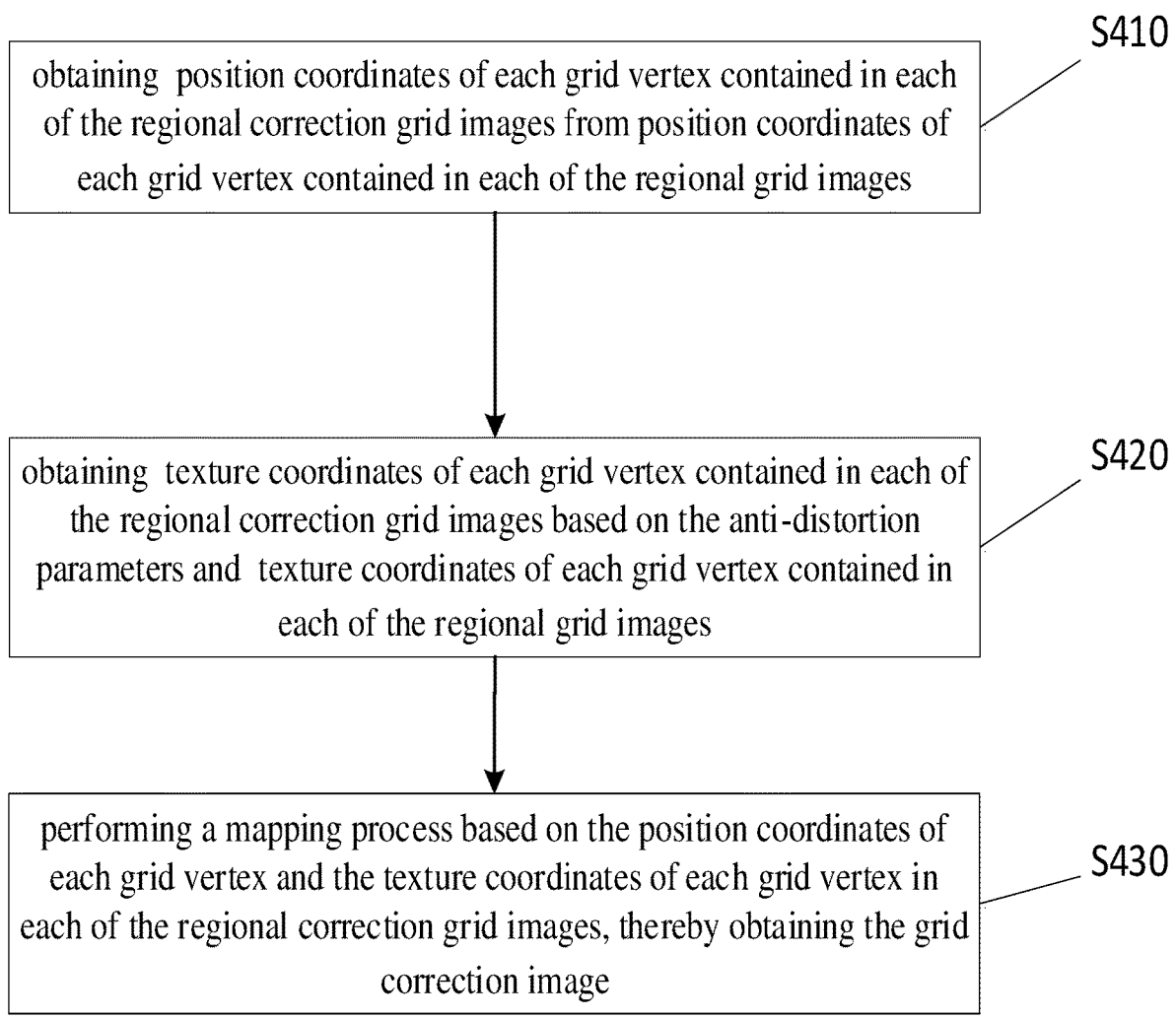
FIG. 12 is a flowchart of an image processing method according to one embodiment of the present disclosure.

In some embodiments, as shown in FIG. 12, adjusting the plurality of regional grid images based on the anti-distortion parameters to obtain the grid correction image formed by the plurality of regional correction grid images includes:

Step S410: obtaining the position coordinate of each grid vertex contained in each of the regional correction grid images from the position coordinates of each grid vertex contained in each of the regional grid images, such that the grid density contained in each of the regional correction grid images increase gradually along the direction away from the geometric center of the original gridded image. In theory, the more the number of grids involved in the grid anti-distortion processing, the better the effect of the grid anti-distortion. It is known as the above-mentioned that the distortion level of the gridded image becomes larger along the direction away from the geometric center of the original gridded image.

Step S420: obtaining texture coordinates of each grid vertex contained in each of the regional correction grid images based on the anti-distortion parameters and texture coordinates of each grid vertex contained in the regional grid images, such that the grid density of each of the regional correction grid images increases gradually along the direction away from the geometric center of the original grid image.

Step S430: performing image mapping based on the grid vertex position coordinates and the grid vertex texture coordinates contained in each of the regional correction grid images to obtain a grid correction image.

In one embodiment, the grid density in the original gridded image is adjusted in different regions, such that the grid density of each of the regional correction grid images gradually increases along the direction away from the geometric center of the original image. The distortion level of the plurality of regional grid images becomes higher and higher along the direction away from the geometric center of the original gridded image. The larger the number of grids involved in the grid anti-distortion processing method, the better the effect of the grid anti-distortion processing. Therefore, the distortion level of the grid correction image is relatively low when performing an image mapping based on the position coordinate of each grid vertex and the texture coordinate of each grid vertex contained in each of the regional correction grid images.

It can be understood that, in the existing technique, when processing the original gridded data using the grid anti-distortion process, the number of grids in the original gridded data may not be adjusted. In some embodiments, the position coordinates of each grid vertex in each of the regional correction grid images are obtained from position coordinates of each grid vertex in each of the regional grid images, such that the grid density of each of the regional correction grid images is less than or equal to the grid density of the original gridded image. Therefore, the number of grids is small compared with the existing grid anti-distortion processing, and the image processing method provided in some embodiments of the present disclosure involves a small number of grids. As a result, the image processing method provided in some embodiments of the present disclosure can be operated on a lower-configured image processor.

Figure 7:
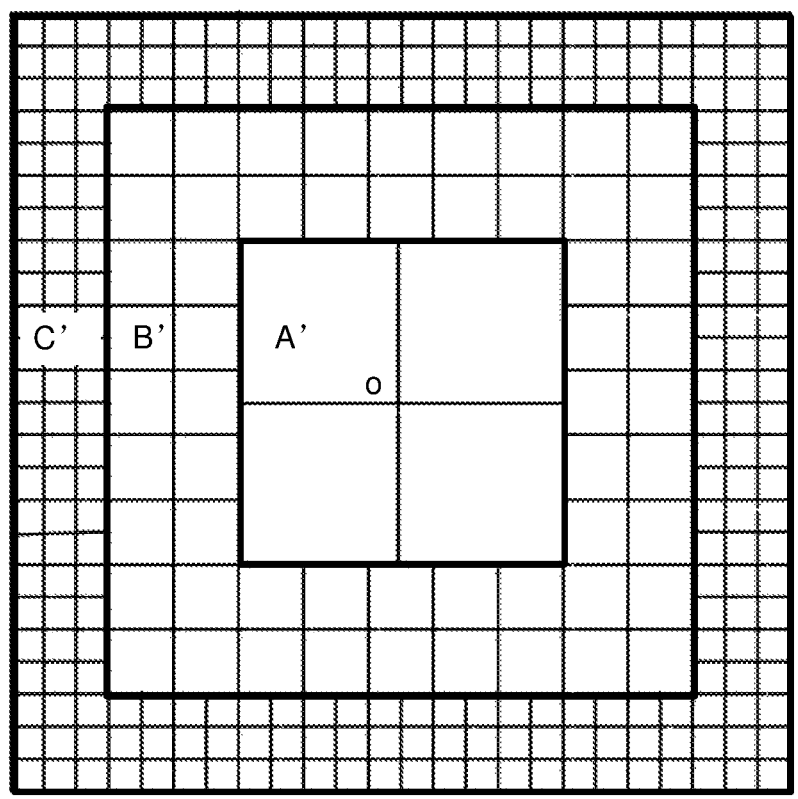
FIG. 7 is a schematic diagram showing distribution of a plurality of regional correction grid images according to one embodiment of the present disclosure.

For example, as shown in FIG. 6 and FIG. 7, as the above-mentioned unidirectional grid parameter N=24 and the region adjustment parameter k=24, the partition factor α=1. As shown in FIG. 6, the original gridded image may be divided into three regional grid images along the direction away from the geometric center of the original gridded image. The three regional grid images include a first regional grid image A, a second regional grid image B, and a third regional grid image C. The first regional grid image A is a 10×10 regional gridded image, and the geometric center of the first regional gridded image is the geometric center O of the original gridded image, and the unidirectional grid parameter N=10×α=10. The central grid vertex of the first regional grid image is the black dot as shown in the FIG. 6. The region is referred to as the first partition region A. The second regional grid image B is a region of the 18×18 regional grid image after removing the 10×10 regional grid image. The region is referred to as the second partition region B. The third regional grid image C is a region of the 24×24 regional grid image after removing the 18×18 regional grid image. The region is referred to as the third partition region C.

Since the grid density contained in each of the regional correction grid images gradually increases along the direction away from the geometric center of the original gridded image, as shown in FIG. 6, the distortion amount of the gridded image in the first partition region is the least, the distortion amount of the gridded image in the second partition region is relatively large, and the distortion amount of the gridded image in the third partition region is the largest. Therefore, the grids contained in the first partition region is reconstructed to convert the 10×10 regional grid image to a 2×2 regional correction grid image, which is referred to as the first regional correction grid image A', and the geometric center of the regional correction grid image A' is the geometric center O of the original gridded image. The first partition region has 121 grid vertices, and the first regional correction grid image A' has 9 grid vertices. The grid vertices contained in the second partition region are reconstructed to obtain a second regional correction grid image. The second partition region has 240 grid vertices, and the second regional correction grid image has 64 grid vertices. The grids contained in the third partition region may or may not be reconstructed. Considering that the distortion of the grid image is the largest in the third partition region, in order to ensure the effect of the grid distortion processing, the grids contained in the third partition region may not be reconstructed, that is, the number of the grid vertices in the third regional correction grid image C' is the same as the number of grid vertices contained in the third partition region. It can be seen that the original gridded image has 625 grid vertices before the grid anti-distortion processing. The image processing method provided in some embodiments of the present disclosure can process the original gridded image to obtain a grid correction image having 337 grid vertices, which has a reduction rate of 46.08%. When obtaining the texture coordinate of each grid vertex in each of the regional correction grid images, based on the anti-distortion parameters and the texture coordinates of each grid vertex in the regional grid image, the amount of data computation can be significantly reduced. As a result, the mapping burden on the image processor can be cut down without affecting the anti-distortion display effect, and the overall performance of the VR mobile terminal can be greatly improved. That is, for VR users demanding higher anti-distortion requirements, under the premise that the number of grid vertices in the original grid image is the same, the image processing method provided in some embodiments of the present disclosure may be used to perform the grid anti-distortion process on the original image to meet the requirements of VR users on the image anti-distortion, thereby improving the experience of the VR users.

Figure 8:
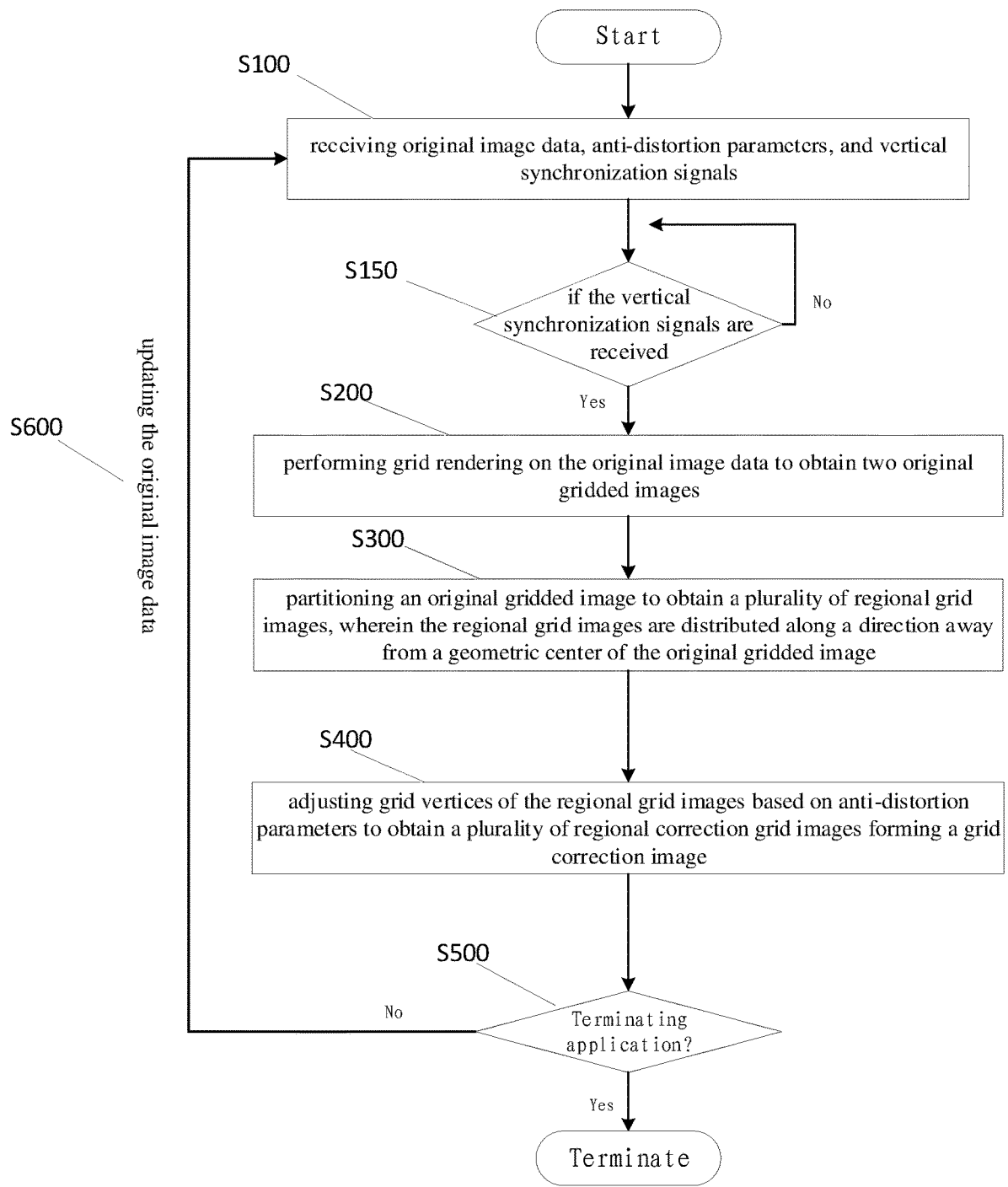
FIG. 8 is a flowchart of an image processing method according to one embodiment of the present disclosure.
Figure 13:
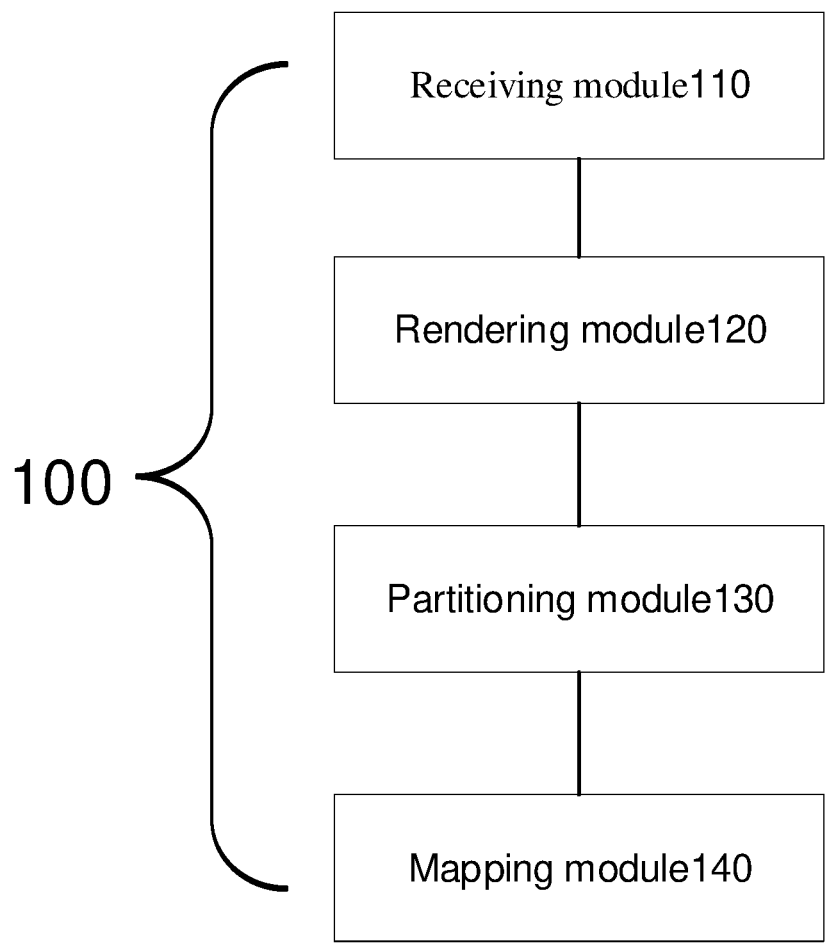
FIG. 13 is a block diagram of an image processing apparatus according to one embodiment of the present disclosure.

As shown in FIG. 8 and FIG. 13, another embodiment of the present disclosure further provides an image processing apparatus 100. The image processing apparatus 100 includes:

a partitioning module 130, configured to partition the original gridded image to obtain a plurality of regional grid images, such that the plurality of regional grid images are distributed along a direction away from a geometric center of the original gridded image;

a grid reconstruction module, configured to adjust grid vertices of the plurality of regional grid images based on the anti-distortion parameter to obtain a grid correction image formed by the plurality of regional correction grid images, such that the grid density of each of the regional correction grid images is less than or equal to the grid density of the corresponding regional grid image, and the number of grid vertices in the plurality of regional correction grid images gradually increases along a direction away from the geometric center of the original gridded image.

Compared with the existing technique, the beneficial effects of the image processing apparatus 100 provided in some embodiments of the present disclosure are the same as those of the image processing method described above, and are not repeated herein.

In some embodiments, as shown in FIG. 9 and FIG. 13, the partitioning module 130 is configured to obtain a partition factor α based on distortion coefficient distribution characteristic of a lens of a VR display apparatus and the original gridded image, and partition the original gridded image based on the partition factor α to obtain the plurality of regional grid images, wherein the plurality of regional grid images are distributed along the direction away from the geometric center of the original gridded image, and the number of grids contained in each of the regional grid images is an integer multiple of the partition factor α, and α is an integer greater than or equal to 1.

In some embodiments, the original gridded image contains an N×N grid matrix, where N is an integer greater than one.

As shown in FIG. 10 and FIG. 13, the partitioning module 130 is configured to obtain a regional adjustment parameter k based on distortion coefficient distribution characteristic of a lens of the VR display apparatus, wherein k is an integer greater than 0; obtain a unidirectional grid parameter N based on the original gridded image; determine whether the unidirectional grid parameter N is an integer multiple of k; if the unidirectional grid parameter N is an integer multiple of k, obtain the partition factor α base on the unidirectional grid parameter N and the regional adjustment parameter k; otherwise, reset the unidirectional grid parameter N and obtain a grid correction parameter N', which is an integer multiple of k, and obtain the partition factor α base on the grid correction parameter N' and the regional adjustment parameter k, wherein $$|N - N'| \leq \frac{k}{2}.$$

In some embodiments, as shown in FIG. 11 and FIG. 13, the partitioning module 130 is configured to obtain central grid vertex information of the original gridded image from the original gridded image, wherein the central grid vertex information of the original gridded image is the geometric center of the original gridded image; obtain the plurality of regional grid images based on the geometric center of the original gridded image and the partition factor α, wherein the number of grids contained in each of the regional grid images is an integer multiple of the partition factor α; obtain each grid vertex information included in the plurality of regional grid images based on the plurality of regional grid images, wherein the grid vertex information includes grid vertex position coordinates and grid vertex texture coordinates, and the plurality of regional grid images is distributed along the direction away from the geometric center of the original gridded image.

In some embodiments, as shown in FIG. 12 and FIG. 13, the grid reconstruction module is configured to obtain position coordinates of each grid vertex contained in each of the regional correction grid images from position coordinates of each grid vertex contained in each of the regional grid images, wherein the grid density of each of the regional correction grid images gradually increases along the direction away from the geometric center of the original gridded image; obtain texture coordinates of each grid vertex contained in each of the regional correction grid images based on the anti-distortion parameters and texture coordinates of each grid vertex contained in the regional grid image, wherein the grid density of each of the regional correction grid images gradually increases along the direction away from the geometric center of the original grid image.

Further, as shown in FIG. 6 and FIG. 13, the image processing apparatus 100 further includes a mapping module 140, configured to perform a mapping process based on the position coordinates of each grid vertex and the texture coordinates of each grid vertex in each of the regional correction grid images, thereby obtaining the grid correction image.

In some embodiments, the image processing apparatus 100 further includes a receiving module 110, configured to receive original image data, anti-distortion parameters, and vertical synchronization signals before partitioning the original gridded image.

In some embodiments, the image processing apparatus 100 further includes a rendering module 120, configured to perform grid rendering on the original image data when the vertical synchronization signals are received to obtain two original gridded images. The two original gridded images include a left eye original gridded image and a right eye original gridded image.

In some embodiments, after obtaining the grid correction image formed by the plurality of regional correction grid images, the receiving module 110 is further configured to update the original image data.

In one embodiment, the receiving module 110, the rendering module 120, the partitioning module 130, the mapping module 140, the grid reconstruction module are a central processing unit (CPU) or a field-programmable logic array (FPGA), a microcontroller (MCU), a digital signal processor (DSP), an application-specific integrated circuit (ASIC), or a graphics processing unit (GPU) having processing power and/or program execution capability. One or more modules may be configured to form a module group to simultaneously execute the above-described rendering method. Alternatively, some of the modules perform partial steps of the above-described rendering method, and some of the modules perform other partial steps of the above-described rendering methods.

The computer readable program instructions may be loaded onto a computer, other programmable data processing apparatus, or other device to cause a series of operational steps to be performed on the computer, other programmable apparatus or other device to produce a computer implemented process.

The computer product can be connected to various input devices (such as a user-interface, a keyboard, etc.), various output devices (such as speakers, network cards, etc.), and display apparatuses to achieve the interaction of computer products with other products or users exchanges, and the description thereof will not be repeated here.

The connection may be through a network connection, such as a wireless network, a wired network, and/or any combination of a wireless network and a wired network. The network may include a local area network, the internet, a telecommunications network (Internet of Things), and/or any combination of the above-networks, etc. The wired network can communicate by means of twisted pair, coaxial cable or optical fiber transmission. A wireless communication network such as 3G/4G/5G mobile communication network, Bluetooth, Zigbee or Wi-Fi can be used.

Embodiments of the present disclosure also provide a display apparatus including a display screen. The display apparatus is connected to the computer product of the above embodiments and the data transmission apparatus. The computer acquires and renders the entire display image to be rendered and displayed, the data transmission apparatus receives the output from the computer and transmits the data to the display apparatus to display the image.

The computer product can be separated from the display apparatus or integrated into the display apparatus. The image to be rendered may be provided by the separated computer product or the integrated display apparatus.

In one embodiment, the data transmission apparatus is coupled to the display driving circuit of the display screen. For example, the interface of the data transmission apparatus connects to the connector of the display screen, such as video graphics array (VGA), digital visual interface (DVI), high-definition multimedia interface (HDMI), and display port (DP), etc.

In one embodiment, the data transmission apparatus is a display connection cable connecting to the display screen interface.

In one embodiment, the data transmission apparatus is a display signal transceiver based on wireless implementation, for example, the wireless display transceiver capable of performing display functions such as Air Play, digital living network alliance device (DLNA), Miracast, wireless display (WiDi), and Chromecast.

In one embodiment, the processor of the computer product is configured to partition an original gridded image to obtain a plurality of regional grid images, wherein the regional grid images are distributed along a direction away from a geometric center of the original gridded image; and to adjust grid vertices of the regional grid images based on anti-distortion parameters to obtain a plurality of regional correction grid images forming a grid correction image. Compared with the existing technique, the beneficial effects of the display apparatus provided in some embodiments of the present disclosure are the same as those of the image processing apparatus 100 described above and are not repeated herein.

In one embodiment, the display apparatus may be any product or component having a display function, such as a mobile phone, a tablet computer, a television, a display, a notebook computer, a digital photo frame, or a navigator.

In one embodiment, the display apparatus may be a head mounted display apparatus including, but not limited to, head mounted display apparatus for VR, AR, MR, and CR, etc.

Another embodiment of the present disclosure further provides a computer storage medium for storing one or more computer software instructions including a program designed to execute the image processing method described above according to one embodiment of the present disclosure.

Compared with the existing technique, the beneficial effects of the computer storage medium provided in the present disclosure are the same as those of the image processing method described above, and are not repeated herein.

Figure 14:
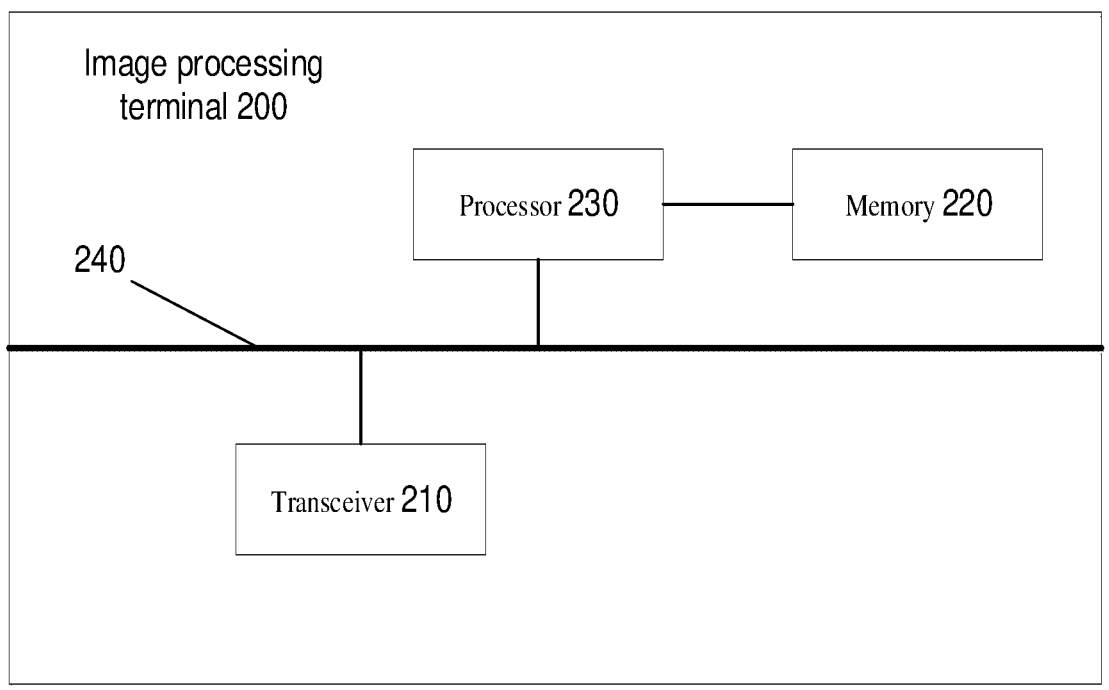
FIG. 14 is a hardware diagram of an image processing terminal according to one embodiment of the present disclosure.

As shown in FIG. 14, one embodiment of the present disclosure further provides an image processing terminal 200. The image processing terminal 200 includes a transceiver 210, a processor, a memory 220, and a bus 240. The transceiver 210, the processor 230, and the memory 220 communicate with one another through the bus 240.

The memory 220 is configured to store a plurality of instructions to implement the image processing method described above, and the processor 230 executes the plurality of instructions to implement the image processing method described above.

The processor 230 in one embodiment may be a processor or be referred to as a collective name of multiple processing elements. For example, the processor 230 may be a central processing unit (CPU), or may be an application specific integrated circuit (ASIC), or one or more configured to implement the embodiments of the present disclosure. For example, it may be an integrated circuit, such as one or more digital signal processors (DSPs), or one or more field programmable gate arrays (FPGAs).

The memory 220 may be a storage device or be referred to as a collective name of a plurality of storage elements, and is used to store executable program code or the like. In addition, the memory 220 may include random access memory (RAM), and may also include non-volatile memory such as a magnetic disk memory, a flash memory, or the like.

The bus 240 may be an industry standard architecture (ISA) bus, a peripheral component (PCI) bus, or an extended industry standard architecture (EISA) bus. The bus 240 can be divided into an address bus, a data bus, a control bus, and the like. For ease of representation, only one thick line is shown in FIG. 14, but it does not mean that there is only one bus or one type of bus.

The various embodiments in the specification are described in a progressive manner, and the same or similar parts between the various embodiments may be referred to each other, and each embodiment focuses on the differences from the other embodiments. In particular, for the apparatus embodiment, since it is basically similar to the method embodiment, the description is relatively simple, and the relevant parts can be referred to the description of the method embodiment.

A person skilled in the art can understand that all or part of the process of implementing the above embodiment method can be completed by a computer program to instruct related hardware, and the program can be stored in a computer readable storage medium. When executed, the flow of an embodiment of the methods as described above may be included. The storage medium may be a magnetic disk, an optical disk, a read-only memory (ROM), or a random access memory (RAM).

In the description of the above embodiments, specific features, structures, materials or characteristics may be combined in any suitable manner in any one or more embodiments or examples.

The above is only a specific embodiment of the present disclosure, but the scope of the present disclosure is not limited thereto, and any person skilled in the art can think of changes or substitutions within the technical scope of the present disclosure. It should be covered by the scope of the present disclosure. Therefore, the scope of the disclosure should be determined by the scope of the appended claims.

What is claimed is:

1. An image processing method, comprising:
   partitioning an original gridded image to obtain a plurality of regional grid images, wherein the regional grid images are distributed along a direction away from a geometric center of the original gridded image; and adjusting grid vertices of the regional grid images based on anti-distortion parameters to obtain a plurality of regional correction grid images forming a grid correction image, wherein a grid density of each of the regional correction grid images is smaller than or equal to a grid density of a corresponding regional grid image, and the grid density of each of the plurality of the regional correction grid images gradually increases along the direction away from the geometric center of the original gridded image;

wherein partitioning the original gridded image to obtain the plurality of regional grid images comprises:

obtaining a partition factor α based on distortion coefficient distribution characteristic of a lens of a VR display apparatus and the original gridded image, wherein α is an integer greater than or equal to 1; and partitioning the original gridded image based on the partition factor α to obtain the plurality of regional grid images, wherein the plurality of regional grid images is distributed along the direction away from the geometric center of the original gridded image, and a number of grids contained in each of the regional grid images is an integer multiple of the partition factor α.

2. The image processing method according to claim 1, wherein the original gridded image comprises a 24×24 grid matrix and is divided into three regional grid images along the direction away from the geometric center of the original gridded image, the three regional grid images comprise a first regional grid image, a second regional grid image, and a third regional grid image, the first regional grid image comprises a 10×10 grid matrix, and a geometric center of the first regional grid image is the geometric center of the original gridded image, the second regional grid image comprises a 18×18 grid matrix outside the first regional grid image, the third regional grid image comprises a 24×24 grid matrix outside the second regional grid image.

3. The image processing method according to claim 1, wherein the original gridded image comprises an N×N grid matrix, and N is an integer greater than 1; and obtaining the partition factor α based on the distortion coefficient distribution characteristic of the lens of the VR display apparatus and the original gridded image comprises:

obtaining a regional adjustment parameter k based on the distortion coefficient distribution characteristic of the lens of the VR display apparatus, wherein k is an integer greater than 0;

obtaining a unidirectional grid parameter N based on the original gridded image;

determining whether the unidirectional grid parameter N is an integer multiple of k;

if the unidirectional grid parameter N is an integer multiple of k, obtaining a partition factor α based on the unidirectional grid parameter N and the regional adjustment parameter k; and if otherwise, resetting the unidirectional grid parameter N to obtain a grid correction parameter N', which is an integer multiple of k, and obtaining the partition factor α base on the grid correction parameter N' and the regional adjustment parameter k, wherein $$|N - N'| \le \frac{k}{2}.$$

4. The image processing method according to claim 1, wherein partitioning the original gridded image based on the partition factor α comprises:

obtaining central grid vertex information of the original gridded image from the original gridded image, wherein the central grid vertex information of the original gridded image is the geometric center of the original gridded image;

obtaining the plurality of regional grid images based on the geometric center of the original gridded image and the partition factor α, wherein the number of grids contained in each of the region grid images is an integer multiple of the partition factor α; and obtaining each grid vertex information in the plurality of regional grid images based on the plurality of regional grid images, wherein the plurality of regional grid images is distributed along the direction away from the geometric center of the original gridded image.

5. The image processing method according to claim 1, wherein adjusting the grid vertices of the regional grid images based on the anti-distortion parameters to obtain the plurality of regional correction grid images forming the grid correction image comprises:

obtaining position coordinates of each grid vertex contained in each of the regional correction grid images from position coordinates of each grid vertex contained in each of the regional grid images;

obtaining texture coordinates of each grid vertex contained in each of the regional correction grid images based on the anti-distortion parameters and texture coordinates of each grid vertex contained in each of the regional grid images; and performing a mapping process based on the position coordinates of each grid vertex and the texture coordinates of each grid vertex in each of the regional correction grid images, thereby obtaining the grid correction image.

6. The image processing method according to claim 1, before partitioning the original gridded image, further comprising:

receiving original image data, anti-distortion parameters, and vertical synchronization signals; and if the vertical synchronization signals are received, performing grid rendering on the original image data to obtain two original gridded images.

7. The image processing method according to claim 6, wherein the two original gridded images comprise a left eye original gridded image and a right eye original gridded image.

8. The image processing method according to claim 6, after obtaining the grid correction image formed by the plurality of regional correction grid images, further comprising:

updating the original image data.

9. An image processing apparatus, comprising:

a partitioning module, configured to partition an original gridded image to obtain a plurality of regional grid images, wherein the plurality of regional grid images are distributed along a direction away from a geometric center of the original gridded image; and a grid reconstruction module, configured to adjust grid vertices of the regional grid images based on anti-distortion parameters to obtain a plurality of regional correction grid images forming a grid correction image, wherein a grid density of each of the regional correction grid images is smaller than or equal to a grid density of a corresponding regional grid image, and the grid density of each of the plurality of the regional correction grid images gradually increases along the direction away from the geometric center of the original gridded image;

wherein the partitioning module is configured to obtain a partition factor a based on distortion coefficient distribution characteristic of a lens of a VR display apparatus and the original gridded image, and partition the original gridded image based on the partition factor α0 to obtain the plurality of regional grid images, wherein the plurality of regional grid images are distributed along the direction away from the geometric center of the original gridded image, and a number of grids contained in each of the regional grid images is an integer multiple of the partition factor α, and α is an integer greater than or equal to 1.

10. The image processing apparatus according to claim 9, wherein the original gridded image comprises an N×N grid matrix, and N is an integer greater than one; and the partitioning module is configured to:
   obtain a regional adjustment parameter k based on the distortion coefficient distribution characteristic of the lens of the VR display apparatus, wherein k is an integer greater than 0;
   obtain a unidirectional grid parameter N based on the original gridded image;
   determine whether the unidirectional grid parameter N is an integer multiple of k;
   if the unidirectional grid parameter N is an integer multiple of k, obtain the partition factor α based on the unidirectional grid parameter N and the regional adjustment parameter k,; and if otherwise, reset the unidirectional grid parameter N to obtain a grid correction parameter N', which is an integer multiple of k, and obtain the partition factor α base on the grid correction parameter N' and the regional adjustment parameter k, wherein $$|N - N'| \leq \frac{k}{2}.$$

11. The image processing apparatus according to claim 10, wherein the partitioning module is further configured to:
   obtain central grid vertex information of the original gridded image from the original gridded image, wherein the central grid vertex information of the original gridded image is the geometric center of the original gridded image;
   obtain the plurality of regional grid images based on the geometric center of the original gridded image and the partition factor α, wherein the number of grids contained in each of the regional grid images is an integer multiple of the partition factor α; and
   obtain each grid vertex information in the plurality of regional grid images based on the plurality of regional grid images, wherein the plurality of regional grid images is distributed along the direction away from the geometric center of the original gridded image.

12. The image processing apparatus according to claim 9, wherein the grid reconstruction module is configured to:
   obtain position coordinates of each grid vertex contained in each of the regional correction grid images from position coordinates of each grid vertex contained in each of the regional grid images; and
   obtain texture coordinates of each grid vertex contained in each of the regional correction grid images based on the anti-distortion parameters and texture coordinates of each grid vertex contained in each of the regional grid images.

13. The image processing apparatus according to claim 12, further comprising a mapping module, configured to perform a mapping process based on the position coordinates of each grid vertex and the texture coordinates of each grid vertex in each of the regional correction grid images to obtain the grid correction image.

14. The image processing apparatus according to claim 9, further comprising:
   a receiving module, configured to receive original image data, anti-distortion parameters, and vertical synchronization signals before partitioning the original gridded image; and
   a rendering module, configured to perform grid rendering on the original image data when the vertical synchronization signals are received, thereby obtaining two original gridded images.

15. The image processing apparatus according to claim 13, after obtaining the grid correction image formed by the plurality of regional correction grid images, the receiving module is further configured to update the original image data.

16. The image processing apparatus according to claim 14, wherein the two original gridded images comprise a left eye original gridded image and a right eye gridded image.

17. A computer product, comprising one or more processors, the one or more processors is configured to implement the image processing method according to claim 1.

18. A computer storage medium having stored thereon computer program instructions, wherein the image processing method of claim 1 is implemented when the computer program instructions are executed by a processor.

* * * * *